US008505893B2

(12) United States Patent
Haimer

(10) Patent No.: US 8,505,893 B2
(45) Date of Patent: Aug. 13, 2013

(54) MEANS FOR PREVENTING TOOLS FROM BEING PULLED OUT FROM TOOL HOLDERS WITH A TOOL HOLDING FIXTURE

(75) Inventor: Franz Haimer, Hollenbach-Igenhausen (DE)

(73) Assignee: Franz Haimer Maschinenbau KG (DE)

( * ) Notice: Subject to any disclaimer, the term of this patent is extended or adjusted under 35 U.S.C. 154(b) by 884 days.

(21) Appl. No.: 12/296,892

(22) PCT Filed: Apr. 5, 2007

(86) PCT No.: PCT/EP2007/003118
§ 371 (c)(1),
(2), (4) Date: Oct. 10, 2008

(87) PCT Pub. No.: WO2007/118626
PCT Pub. Date: Oct. 25, 2007

(65) Prior Publication Data
US 2009/0179368 A1 Jul. 16, 2009

(30) Foreign Application Priority Data

Apr. 10, 2006 (DE) .......................... 10 2006 016 784
Jun. 19, 2006 (DE) .......................... 10 2006 028 408

(51) Int. Cl.
*B24Q 1/00* (2006.01)
*B23B 31/117* (2006.01)
*B23G 1/46* (2006.01)
*B23C 1/00* (2006.01)
*B23B 31/10* (2006.01)

(52) U.S. Cl.
USPC .......... 269/54.3; 269/309; 269/310; 408/226; 408/238; 408/239 R; 409/234; 279/93; 279/94

(58) Field of Classification Search
USPC ................... 269/53, 49, 52, 69, 99, 173, 309, 269/310, 54.3; 279/102, 97, 93, 94; 409/234; 408/226, 238, 239 R
See application file for complete search history.

(56) References Cited

U.S. PATENT DOCUMENTS 1,841,635 A * 1/1932 Salmon .................. 76/108.6
3,583,715 A * 6/1971 Jahrl ........................ 279/75
(Continued)

FOREIGN PATENT DOCUMENTS

DE 846952 8/1952
DE 4010597 A1 * 10/1991
(Continued)

OTHER PUBLICATIONS

From corresponding Japanese Pat. Appl. No. 2009-504623: (a) the claims pending as of Sep. 13, 2012, (b) the Final Decision for Rejection issued by the Japanese Patent Office on Oct. 9, 2012, and (c) the claims submitted in an amendment dated Feb. 8, 2013.

*Primary Examiner* — Lee D Wilson
*Assistant Examiner* — Nirvana Deonauth
(74) *Attorney, Agent, or Firm* — Christopher J. Kulish

(57) ABSTRACT

The invention relates to a tool holder with a tool holding fixture, in particular a clamping chuck such as a contracting chuck, a draw-in collet chuck, a hydraulic expanding chuck and a high-precision chuck, and a shank of a tool, in particular a rotary tool, accommodated in it, wherein the tool holder contains a means for preventing the tool from being pulled out, locking it against axial displacement. This pull-out preventing unit comprises at least one locking element and at least one locking groove, which corresponds to the said locking element, receives it and interacts with it in a positively locking manner. In this case, both the locking element and the locking groove are formed at least partly in the manner of a ball head. Preferably, the tool has the locking grooves. On account of preferably spirally arranged locking grooves along the cylindrical shank of rotary tools, the direction of pitch of which grooves corresponds to the direction of the grooves of the tool, axial locking of the tool is obtained, so that the tool cannot be axially displaced from the tool holder during operation. In addition, force-exerting elements are arranged, with the effect of making the tool lie against the pull-out preventer without play after shrink-fitting.

16 Claims, 19 Drawing Sheets

(56) References Cited

U.S. PATENT DOCUMENTS

| | | | |
|---|---|---|---|
| 3,658,351 A * | 4/1972 | Benjamin et al. | 279/75 |
| 3,954,276 A * | 5/1976 | Koniger et al. | 279/97 |
| 4,377,292 A | 3/1983 | Staron | |
| 5,152,541 A | 10/1992 | Baumgartner et al. | |
| 5,234,296 A | 8/1993 | Presby et al. | |
| 5,311,654 A | 5/1994 | Cook | |
| 5,527,208 A * | 6/1996 | Blake et al. | 451/367 |
| 5,556,399 A * | 9/1996 | Huebner | 606/80 |
| 5,582,494 A | 12/1996 | Cook | |
| 5,788,249 A * | 8/1998 | Tagami | 279/51 |
| 6,199,872 B1 * | 3/2001 | Hasan | 279/30 |
| 2001/0042964 A1 * | 11/2001 | Bedi et al. | 279/30 |
| 2005/0238451 A1 | 10/2005 | Hartman | |

FOREIGN PATENT DOCUMENTS

| | | |
|---|---|---|
| DE | 42 22 809 A1 | 1/1993 |
| DE | 92 01 729 U1 | 6/1993 |
| DE | 195 09 224 C2 | 9/1996 |
| DE | 297 08 384 U1 | 8/1997 |
| DE | 199 63 657 A1 | 7/2000 |
| DE | 697 15 654 T2 | 5/2003 |
| EP | 1 029 620 A2 | 8/2000 |
| JP | 9-011007 A | 1/1997 |
| JP | 10-100009 A | 4/1998 |
| JP | 2001-009612 A | 1/2001 |
| JP | 2002 355727 A | 12/2002 |
| JP | 3932216 B2 | 6/2007 |
| JP | 4781329 B2 | 9/2011 |
| WO | 01/89758 A1 | 11/2001 |

* cited by examiner

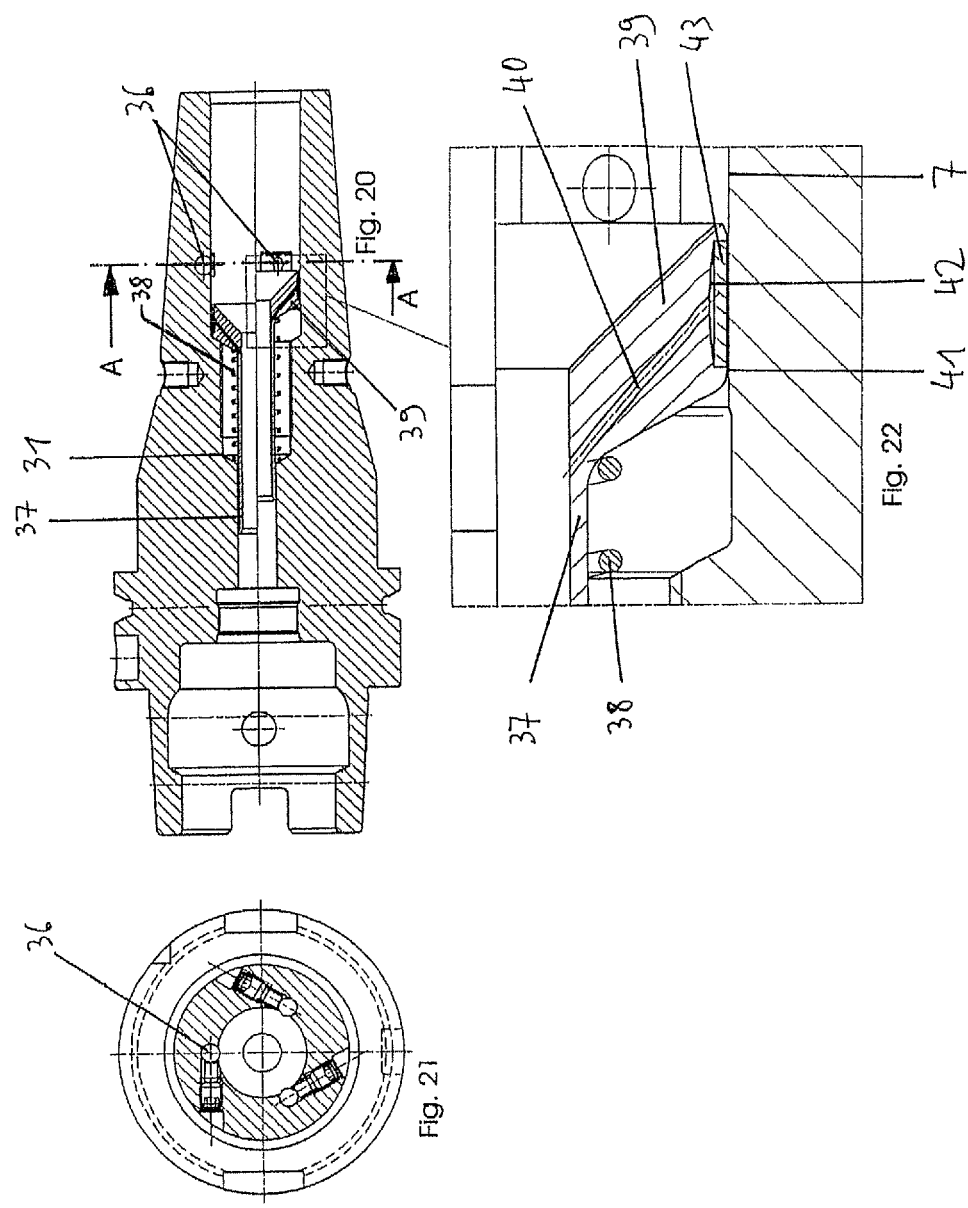

MEANS FOR PREVENTING TOOLS FROM BEING PULLED OUT FROM TOOL HOLDERS WITH A TOOL HOLDING FIXTURE

The present invention relates to tool holders comprising a tool holding fixture, in particular shrink fit chucks and other chucks for receiving rotation tools according to the preamble of patent claim 1.

Tool holders with clamping chucks, in particular shrink fit chucks, are well known. They are being used for clamping tubular tools, turning tools, milling tools, reaming tools, and grinding tools, and similar through a thermally induced shrink process. Typically, such shrink fit chucks are thermally heated by an inductive shrink system, whereby the inner diameter of the shrink fit chuck is expanded. When the inner diameter is enlarged, a tool to be clamped is inserted into the shrink fit chuck, wherein the ratio of the inner diameter of the shrink fit chuck to the shaft diameter of the tool is configured, so that the tool is clamped torque proof in the shrink fit chuck after subsequent cooling of the shrink fit chuck.

From WO 01/89758 A1 it is known to inductively heat the sleeve section by means of an annular coil assembly, substantially surrounding the sleeve section in a coaxial manner. The coil assembly is connected to a high frequency AC generator and induces Eddy currents in the metal sleeve section, which heat the sleeve section. In order to avoid scatter flux and to concentrate the magnetic flux, magnetic flux concentration elements made of soft magnetic electrically substantially non-conductive material, like e.g. ferrite or similar, are disposed at the faces and at the outer circumference of the coil assembly, which direct the magnetic flux generated by the coil assembly to the sleeve section of the tool holder, and in particular into the portion of the free end of the sleeve section.

The problem with tool holders comprising clamping chucks for rotating tools which comprise cylindrical receiving shafts is the axial migration of the rotation tool along the rotation axis of the clamping chuck out of the clamping chuck during operation.

Said axial migration of the rotating tool is caused by vibrations, which occur while machining the work piece with the rotating tool. Due to this detrimental effect, the work pieces cannot be machined precisely and according to their dimensional specifications. Furthermore, canting the rotating tool in the work piece or even in the clamping chuck receiving the work piece can lead to dangerous accidents. Under non-favorable conditions, the rotating tool can even leave the clamping chuck of the tool holder during operation in a marginal situation, and thus create a great hazard for the machine operator.

It is thus the object of the present invention to provide a tool holder with a clamping chuck, in particular a shrink fit chuck or similar, in which an axial migration of the rotating tool, like a spiral drill, profile drill, screw drill including tap, end facing drill, cutter, etc., is not possible during operation, but in which the rotating tool is mounted torque proof, as well as also axially fixated with respect to the rotation axis without any migration out of the chuck.

This object is accomplished according to the invention through the characterizing features of patent claim 1, wherein advantageous improvements of the invention are provided by the features of the dependent claims.

According to the invention, a tool holder according to the invention comprises a pullout preventer for the tool, which prevents axial migration of the tool out of the tool holding fixture. Thus, the pullout preventer comprises at least one locking element and at least one locking groove corresponding thereto, receiving the locking element, which interact through form locking. Thus, the locking element and the locking groove are at least partially configured with a ball head profile, wherein either the clamping chuck comprises the locking elements and the tool comprises the locking grooves, or vice versa. Furthermore, thus the locking grooves, which are disposed starting at the face side, either on the tool shaft, or in the tool holder, can be provided expanded with reference to the groove width, in order to thus facilitate easier insertion of the tool into the tool holder.

In a particularly preferred embodiment, the tool holder comprises at least two rotatably supported balls on the tool holder side, wherein on the side of the rotation tool at least two locking grooves at the shaft of the rotation tool, which correspond to the balls, interact in a form locking manner. The two locking grooves are thus preferably provided like a thread at the cylindrical tool shaft starting at the face side of the cylinder shaft along the circumferential surface of the cylinder shaft. Said locking grooves disposed on the circumferential surface of the cylinder shaft of the rotation tool are provided with a left pitch direction for tools with a left groove and are provided with a right pitch direction for rotation tools with a right groove. Thus, the locking grooves can also be configured in axial direction and thus parallel to the rotation axis, wherein this still provides safety against rotation for the tool.

In order to clamp the rotation tool according to the invention, like e.g. spiral drills, profile drills, screw drills including taps, end facing drills, cutters, and arbors for other tools etc. in the clamping chuck according to the invention, e.g. the shrink fit chuck of the tool holder, the induction coil is initially turned on in the shrink fit chuck, this means the induction coil is connected to high frequency AC power. Due to the Eddy currents occurring in the sleeve section of the tool holder generated by induction from the coil surrounding the tool holder, the sleeve section is quickly heated up, so that it expands thermally, and thus the inner diameter of the receiver opening is enlarged. Now, the rotating tool can be inserted into the receiver opening with its shaft. The face of the rotating tool thus reaches the balls protruding into the inner cavity of the receiver opening and stops there. Depending on the pitch direction of the locking grooves of the rotating tool, said tool is now rotated counterclockwise or clockwise with respect to the rotation axis, so that the balls can engage the ball receiving grooves. Further rotation forces a helical rotation, and thus an axial pull-in movement of the rotation tool into the shrink fit chuck or similar, until the face of the cylindrical shaft contacts the shrink fit chuck or until the balls have reached their final position in the ball receiving locking grooves. The induction coil can be turned off now. Due to the quick cooling which occurs now, the shrink fit chuck shrinks back again to its original size, which connects the cylindrical shaft torque proof with its circumferential surface to the inner circumferential surface of the receiver opening of the shrink fit chuck with a press fit. Since the rotation direction of the locking grooves corresponds to the rotation direction of the rotating tools during the operation of the tool also under high load, that means, under high cutting resistance of the work piece and under large feeds of the tool or of the tool table, an axial migration of the rotation tool along the rotation axis out of the chuck cannot occur anymore. Through the interaction of the balls in the tool holder with the ball profile locking grooves in the tool shaft, and the thread configuration of said locking grooves, an axial locking is accomplished. Said axial locking can only be released by rotating the rotating tool against the operating direction of the rotating tool and pulling it out of the clamping chuck. A rotation performed against the operating direction of the rotation tool during operation is thus, however, not possible when machining the work piece with the rotating tool. Furthermore, said rotating movement, due to the torque proof press fit, is not possible during operation either. Thus, the rotating tool cannot move out of the shrink fit chuck or similar.

Thus, the machining remains precise, and the dimensions can be kept within the required tolerances. Since axial migration out of the chuck is prevented by the present invention, production can be run efficiently and more economically, since, compared to state of the art tool holders with clamping chucks, very little scrap is produced. Additionally, thus another cause for accidents and thus accident risk for the machine operator is excluded.

Instead of the rotatable balls held in a press support in the clamping chuck, also cylindrical pins with a partial or half sphere can be used at one of the faces. These are disposed in the support bore hole instead of the balls, wherein these pins either require a protruding shoulder, so that the cylindrical pin does not fall into the inner cavity of the receiver opening, or an outer thread which corresponds to the inner thread of the support bore hole. Using balls has the advantage compared to using cylindrical pins with a partially spherical or semi-spherical head that inserting the rotation tool is easier compared to cylindrical pins, since the balls are rotatably supported and cannot cant relative to the cylindrical shaft. Balls can also be held in the respective support bore hole using a threaded pin. Thus, the threaded pin comprises a configuration receiving the ball even at its face, e.g. shaped as a polygonal recess or as a ball shaped depression or similar. Instead of the threaded pin, also mating pins, bolts or similar can be used.

The pullout preventer according to the invention for tools, in particular for rotation tools in tool holders, with a tool holding fixture is suited in particular for clamping chucks, like e.g. draw-in collet chucks, high precision chucks, hydraulic expanding chucks, and shrink fit chucks.

Advantageously, depending on requirements, the locking grooves in the circumferential surfaces of the shaft of the tool are configured differently. Thus, the locking grooves can comprise a different locking groove path beginning on the face side. It can be helical, L-shaped, curved, or formed from composite paths on an enveloping surface of a cylinder, which is straight in portions and/or curved. In particular, in a helical locking groove path, the direction of rotation has to correspond to the direction of rotation of the grooved tool. This means, for a left grooved tool, the helical locking groove has to have a left pitch direction; for a right grooved tool, on the other hand, the locking groove has to have a right pitch direction. Therefore, there is a locking effect of the pullout preventer.

In another embodiment, the shaft of the tool comprises an outer thread at the end, and the tool holding fixture of the tool holder comprises an inner thread corresponding thereto. In this case, the pullout preventing feature is implemented using the outer thread at the tool, which has a left pitch direction for a left grooved tool, and a right pitch direction for a right grooved tool. In this embodiment, locking elements and locking grooves become obsolete.

In a particularly preferred embodiment, the support bore holes, which receive the locking elements, are configured preferably from the outer circumferential surface of the tool holder until into the inner cavity of the tool holder receiving the tool. Thus, said support bore holes can be configured perpendicular to the rotation axis of the tool holder and so that they intersect the rotation axis, and/or tangentially adjacent to the inner circumferential surface of the cavity which receives the tool. Preferably, the longitudinal axes of the support bore holes are configured at the same angle, and in particular in a plane perpendicular to the rotation axis of the tool.

In another particularly preferred embodiment, in particular for tool holders with shrink fit chuck, balls are supported as locking elements in a ball retainer. Thus, the support bore holes for the respective balls in the ball retainer comprise a smaller bore hole diameter with respect to the inner circumferential surface than the diameter of the support bore hole. Thus, the balls cannot fall to the inside into the interior of the tool holder, but they only reach over the inner portion of the ball retainer. The ball retainer can thus either be inserted as a separate component in an interlocking manner into the inner cavity of the tool holder, or it can be machined into a sleeve. Thus, the sleeve comprises the respective support bore holes with the smaller support bore hole diameters located towards the inner cavity. The sleeve can thus be pressed or shrunk into the inner cavity of the tool holding fixture, welded to the tool holder, held in a form locking manner by additional threaded pins, and/or fixated with locking elements and locking grooves at the sleeve, as they are described according to the invention at the shaft of rotation tools.

In a particularly preferred embodiment, in particular for shrink fit chucks, the pullout preventer comprises an additional device, which facilitates a support of the tool by the pullout preventer without clearance. Thus, the tool is pressed into the tool holding fixture out of the tool holder by a force imparting element, which is disposed e.g. concentric to the rotation axis of the tool at the bottom of the bore hole of the tool holding fixture. Thus, the pullout preventer contacts the tool without clearance. Since even a small clearance between the pullout preventer and the tool allows the tool a certain mobility, which can also lead to damages of the tool edges. In particular, compression springs in the form of coil springs, conical springs, disk springs, and disk spring packets, and/or elastic or rubber elastic elements can be used as force imparting elements.

In another particularly preferred embodiment of a tool holder with a minimum volume lubrication, said tool holder comprises at least one transfer piece for the minimum volume lubrication, which comprises at least one, preferably plural channels for the pressure buildup or for the pressure compensation. For such a tool holder with such a transfer piece, additional protection may be applied for separately from the pullout preventer. The transfer piece preferably provided as a tube, which can be also comprised of plural components, is preferably formed with a radial flange, and preferably movably received and guided in a bore hole disposed in the tool holder. The tube, which can also comprise different cross section profiles, is preferably supported in the tool holder preloaded by a coil spring, wherein the cylindrical shaft of the tube preferably reaches through the coil spring. Certainly, also other force applying elements, like tension spring, conical spring, disk spring, and/or elastic elements and their combinations are possible. The coil spring is preferably disposed between the radial flange of the tube and e.g. a bottom stop in the tool holder, whereby the tube is supported preloaded relative to the tool holder. The transfer piece is preferably supported in the bore hole, so it is sealed. Thus, the tool holder comprises at least e.g. one shaft seal and/or additional seal elements, like seal rings, seal lips, etc., concentric to the bore hole for the transfer piece or for the tube, wherein said seal elements can also be disposed in the tool holder and/or at the transfer piece or at the tube itself. The channels provided in the form of pass-through bore holes, in particular with circular cross section profile, wherein also other cross section profiles are possible, are preferably disposed in the radial flange of the transfer piece, so that the transfer bore holes in the transfer piece are connected to the transfer bore hole in the radial flange of the transfer piece. Along the cylindrical circumferential surface of the radial flange of the transfer piece, a radial recess is disposed. Therein, an annular membrane is embedded preferably in a form locking manner, which corresponds to the radial cutouts and which is preferably shaped as a section of an enveloping surface of a cylinder. Thus, the circumferential surface recess, in particular provided as a groove, and also the cross section of the membrane embedded in the groove preferably corresponding thereto, can e.g. comprise or a partial ball head profile or other profiles. The annular membrane is preferably formed from an elastic material, in particular from a rubber elastic material, but also other materials are possible, like e.g. carbon fiber material, plastics, Teflon and flexible metals. The channels for the pressure compensation or for pressure venting or pressure buildup are thus in particular connected to the membrane and to the inner cavity of the transfer piece. When pressure is built up in the tool holder, the membrane thus cambers in radial direction, and thus attaches to the circumferential surface of the receiver bore hole of the tool holder. Thus, the transfer piece is locked against axial movement.

Subsequently, embodiments of the invention are described with reference to schematically depicting figures, in which:

FIG. 13 shows a sectional view of the tool holder according to the invention, comprising balls, which are disposed in a ball retainer, which is machined into the sleeve, wherein the sleeve is pressed in or shrunk in;

FIG. 20 shows a sectional view of the tool holder according to the invention, comprising a minimum volume lubrication, balls as locking elements, and a membrane made of rubber elastic material;

FIG. 21 shows a sectional view and a side view of the tool holder according to FIG. 20 according to the invention with a tangential disposition of the locking elements;

FIG. 22 shows an enlarged illustration of a portion of FIG. 20 of the tool holder according to the invention with the membrane and a pressure channel in the transfer piece.

Figure 1:
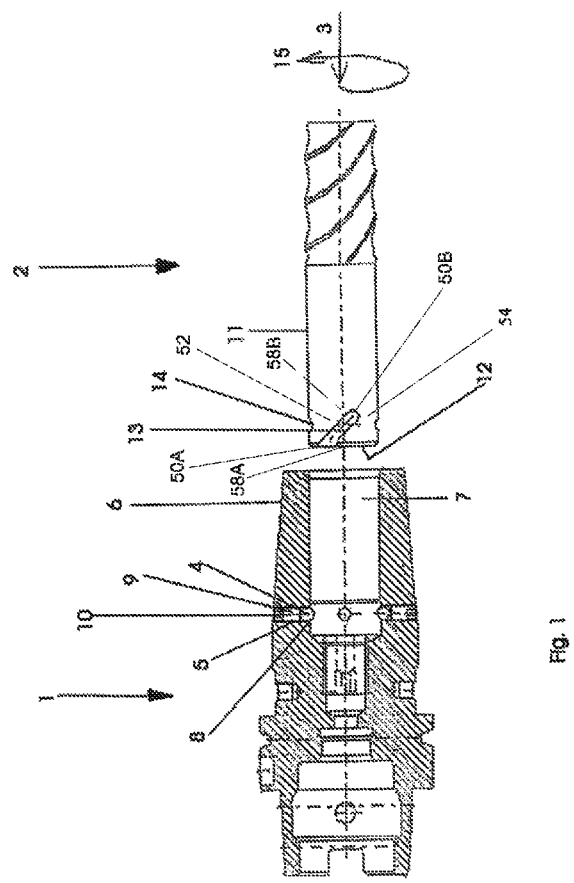
FIG. 1 shows a sectional view of the tool holder according to the invention, comprising a shrink fit chuck with a separate end mill cutter, which is provided with locking grooves and which is not yet clamped.
Figure 1A:
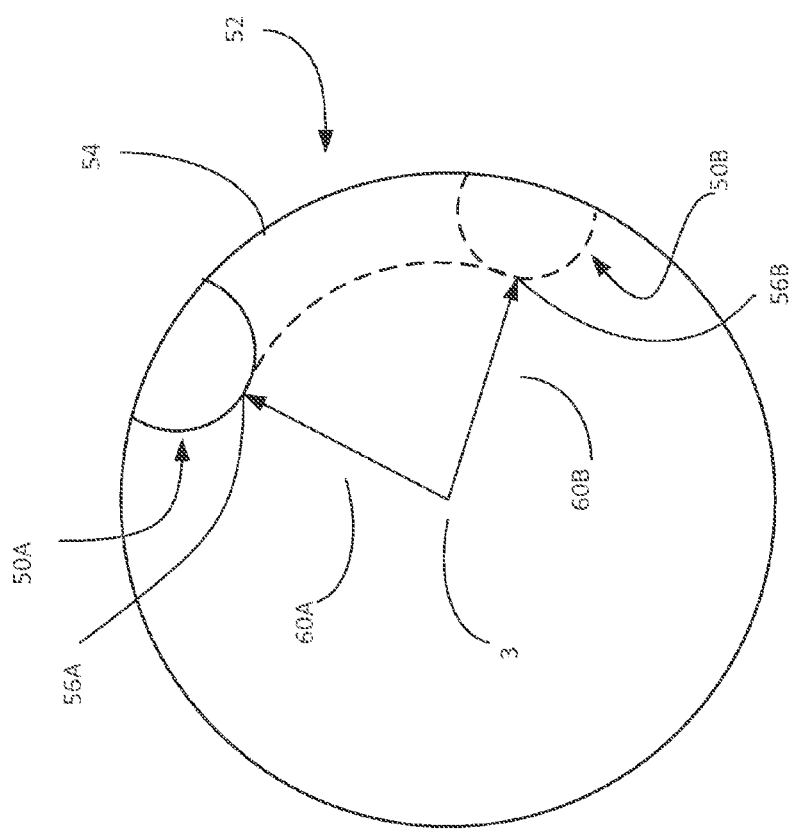
FIG. 1A is an end view of the end mill cutter shown in FIG. 1.

FIG. 1 shows the tool holder 1 schematically in a sectional view and an exemplary tool, namely, an end mill cutter 2, which are disposed relative to one another with respect to a rotation axis 3. The tool holder 1 thus comprises at least two, preferably three or four, balls 4. The ball is thus disposed in a support bore hole 5, which is disposed perpendicular to the rotation axis 3, and thus to the longitudinal axis in the sleeve section 6 of the tool holder 1. Said support bore hole 5 is a pass-through bore hole and extends from the outside of the sleeve section 6 to the inner circumferential surface of the receiver opening 7, which is disposed concentric with the rotation axis 3 in the tool holder 1. The front support side 8 of the support bore hole 5 is provided in the shape of a spherical cap or configured according to the ball shape of the ball 4, so that the ball 4 partially protrudes into the inner cavity of the receiver opening 7. The ball 4 is held by a threaded pin 9 in its forward position, thus in a position protruding into the inner cavity of the receiver opening 7. Thus, the support bore hole 5 comprises an inner thread corresponding to the outer thread of the threaded pin 9. Thus, the length of the threaded pin 9 does not protrude beyond the outer surface of the sleeve section 6. The threaded pin 9 thus comprises a hexagonal hole 10 for an Allen wrench. The end mill cutter 2 comprises the helical locking grooves 13, 14 on its cylinder shaft 11 proximal to the face 12. They comprise a ball shaped profile, which corresponds to the ball shape of the ball 4. The helical locking groove 13 extends from a first terminal end 50A to a second terminal end 50B. The groove 13 has a curved portion 52 located between the first and second terminal ends 50A, 50B. The curved portion 52 is also defined by a cylindrical surface 54 associated with the cylindrical shaft 11. To elaborate, the cylindrical surface 54 substantially defines the lateral extent of the groove 13 and the curved portion 52 of the groove 13. With reference to FIG. 1, the curved portion 52 is angularly disposed relative to the rotation axis 3, i.e., the curved portion does not extend parallel to the rotation axis 3. With reference to FIG. 1A, a first point 56A is associated with the curved portion 52 of the groove 13 and located at or near the first terminal end 50A. A second point 56B is also associated with the curved portion 52 and located at or near the second terminal end 50B. As such, the first point 56A is separated from the second terminal point 56B. Respectively associated with the points 56A, 56B are points 58A, 58B (FIG. 1) that are each located on the rotation axis 3 and separated from one another. With reference to FIG. 1A, a radial distance 60A between points 56A and 58A and a radial distance 60B between points 56B and 58B are substantially equal. In order to completely clamp the end mill cutter in the tool holder, the tool holder has to be rotated according to the rotation direction 15 during insertion of the end mill cutter, so that the end mill cutter 2 is rotated into the receiver opening 7 in a helical motion until the end mill cutter 2 has reached a stop.

Figure 2:
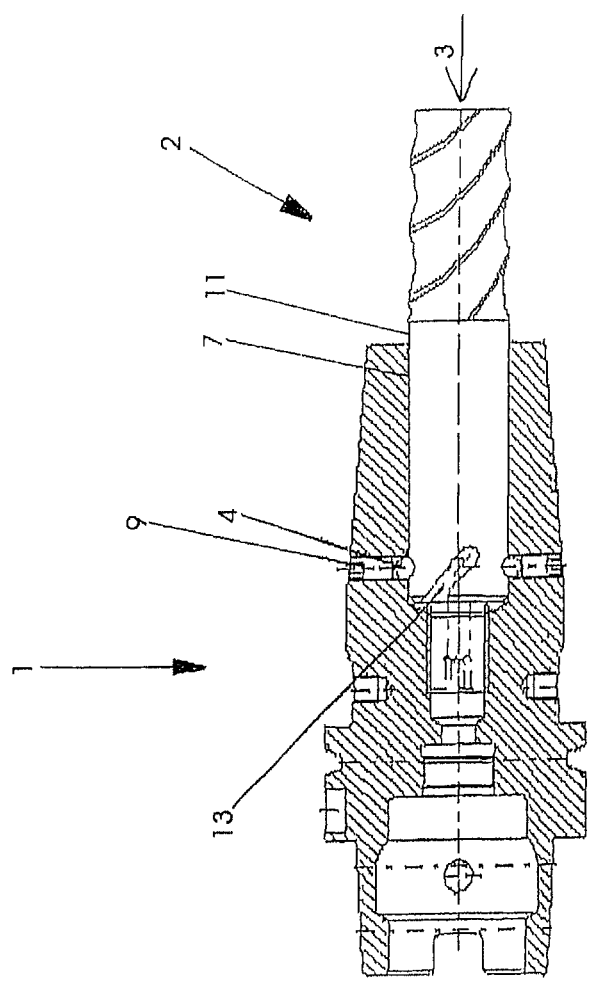
FIG. 2 shows a sectional view of the tool holder according to the invention, comprising a shrink fit chuck with an end mill cutter according to the invention clamped therein.

FIG. 2 schematically illustrates a tool holder 1 in a sectional view, in which the end mill cutter 2 is completely clamped in. The end mill cutter 2 is disposed up to its stop with its cylindrical shaft 11 in the receiver opening 7. Thus, the ball 4, which is supported by the threaded pin 9, engages the locking groove 13 or 14. In this graphic sectional view, the cylinder shaft 11 is press fitted in the receiver opening 7, this means, the induction coil (not shown in the drawing) is turned off and the shrink fit chuck of the tool holder 1 is cooled down and shrunk back to its original size. As clearly visible in FIG. 2, an axial movement of the end mill 2 along the rotation axis 3 cannot be performed, since the ball 4 is located in the ball shaped locking groove 13 or 14 in the cylinder shaft 11, so that a movement along the rotation axis 3 is blocked. Thus, the interaction between the ball 4 and the locking groove 13 or 14 is depicted in the form of a lock. In order to remove the end mill 2 cutter from the tool holder 1, the end mill 2 after switching on the induction coil only has to be rotated against the rotation direction 15 (re. FIG. 1), and pulled in axial direction along the rotation axis 3 out of the tool holder 1.

In the subsequent figures, viable embodiments are illustrated, showing how the pullout preventer is configured in other state of the art clamping tools.

Figure 3:
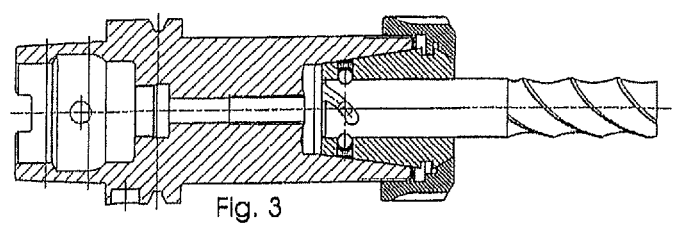
FIG. 3 shows a sectional view of the tool holder according to the invention, comprising a shrink fit chuck with an end mill cutter according to the invention clamped therein.

FIG. 3 shows a typical draw-in collet chuck with cap nut with the pullout preventer with the locking grooves and balls in a schematic sectional view.

Figure 4:
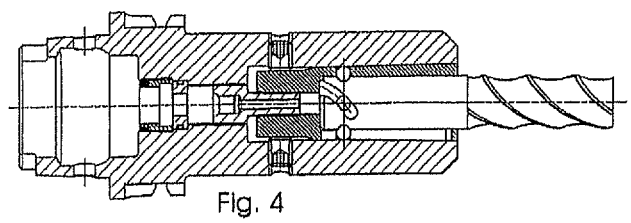
FIG. 4 shows a sectional view of the tool holder according to the invention, comprising a high precision chuck and an end mill cutter according to the invention clamped therein.

FIG. 4 shows a high precision chuck with the pullout preventer according to the invention through locking grooves and balls.

Figure 5:
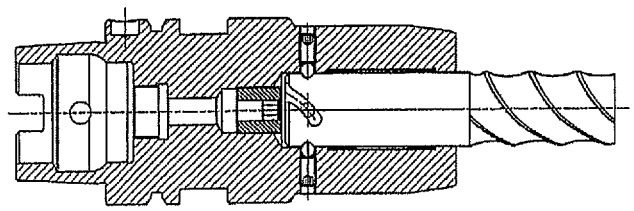
FIG. 5 shows a sectional view of the tool holder according to the invention, comprising a hydraulic expanding chuck with end mill cutter according to the invention clamped therein.

FIG. 5 shows a typical hydraulic expansion chuck with the pullout preventer according to the invention through locking grooves and balls in a schematic sectional view.

Figure 6:
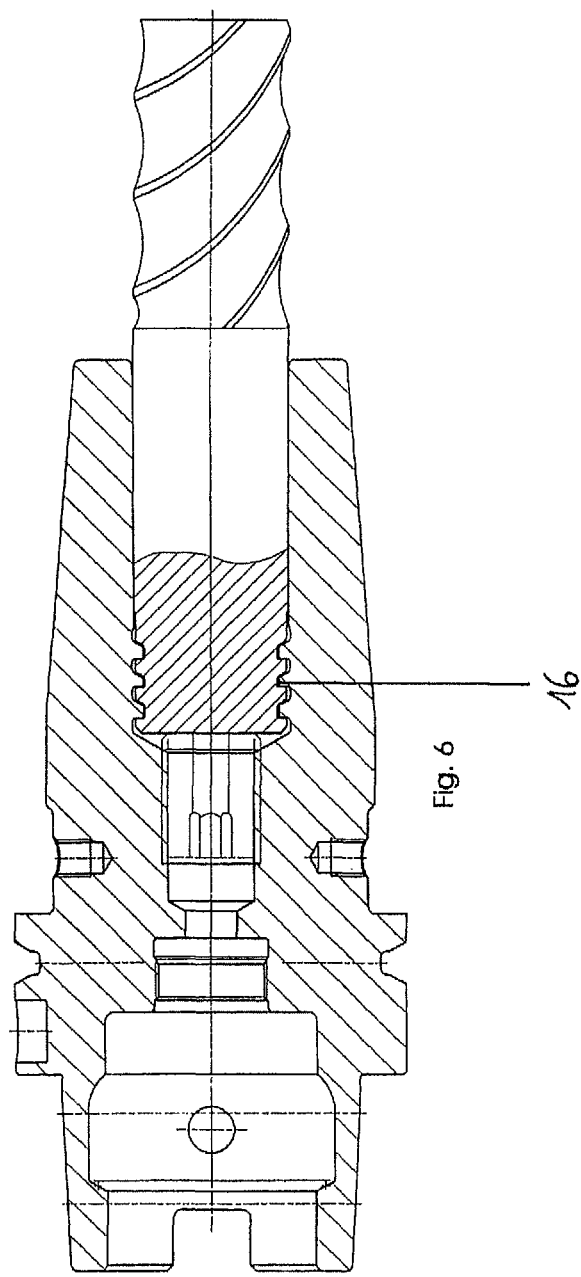
FIG. 6 shows a sectional view of the tool holder according to the invention, comprising an end mill cutter according to the invention clamped therein, where the tool comprises an exterior thread, which is threaded into a corresponding interior thread of the tool holder.

FIG. 6 shows a tool holder provided as shrink fit chuck in a schematic sectional view, where the end mill cutter is bolted to the tool through a thread 16. Through this threaded connection, which is configured with a left pitch direction for a left grooved tool, and a right pitch direction for a right grooved tool, an axial pullout prevention of the tool from the tool holder is implemented.

Figure 7:
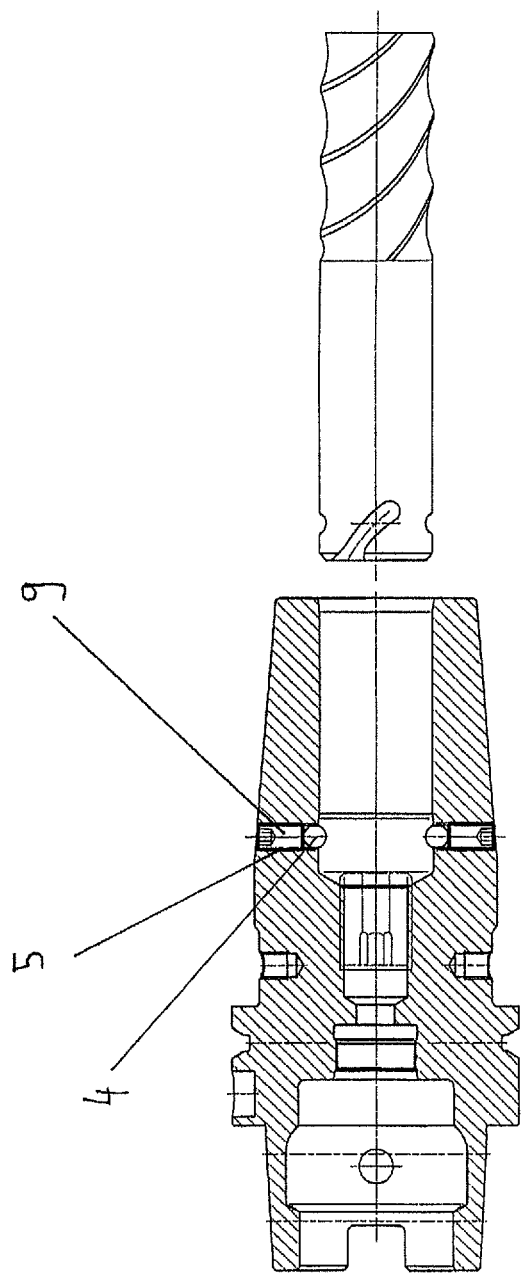
FIG. 7 shows a sectional view of the tool holder according to the invention, comprising balls as locking elements, which are secured by threaded pins.

FIG. 7 shows a shrink fit chuck in a schematic sectional view with locking elements in the form of balls 4, which are held in the respective support bore holes 5 with threaded pins 9. The threaded pin 9 thus comprises a blunt face.

Figure 8:
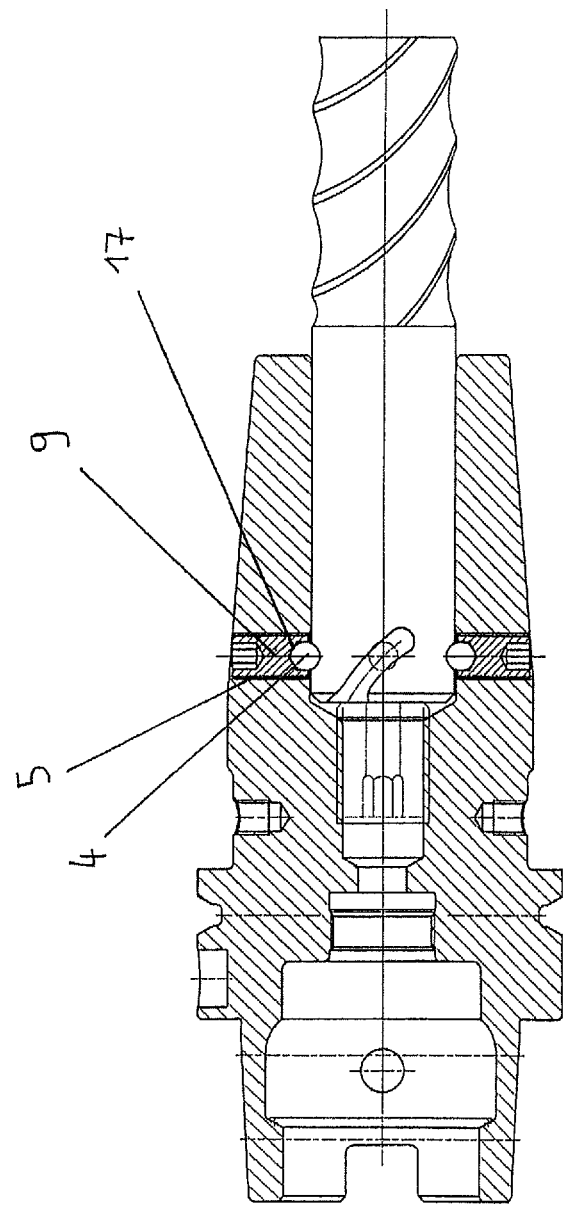
FIG. 8 shows a sectional view of the tool holder according to the invention, comprising balls as locking elements, which are secured by threaded pins, where the balls are partially recessed into the threaded pins.

FIG. 8 shows a shrink fit chuck with locking elements configured as balls 4 in a purely schematic sectional view, where the balls are held in the support bore holes 5 by threaded pins 9. The threaded pin 9 comprises a recess 17 on the face receiving the ball 4. The recess 17 is configured as a dead hole or e.g. configured as bushing with an interior hexagonal shape corresponding to the diameter of the ball.

Figure 9:
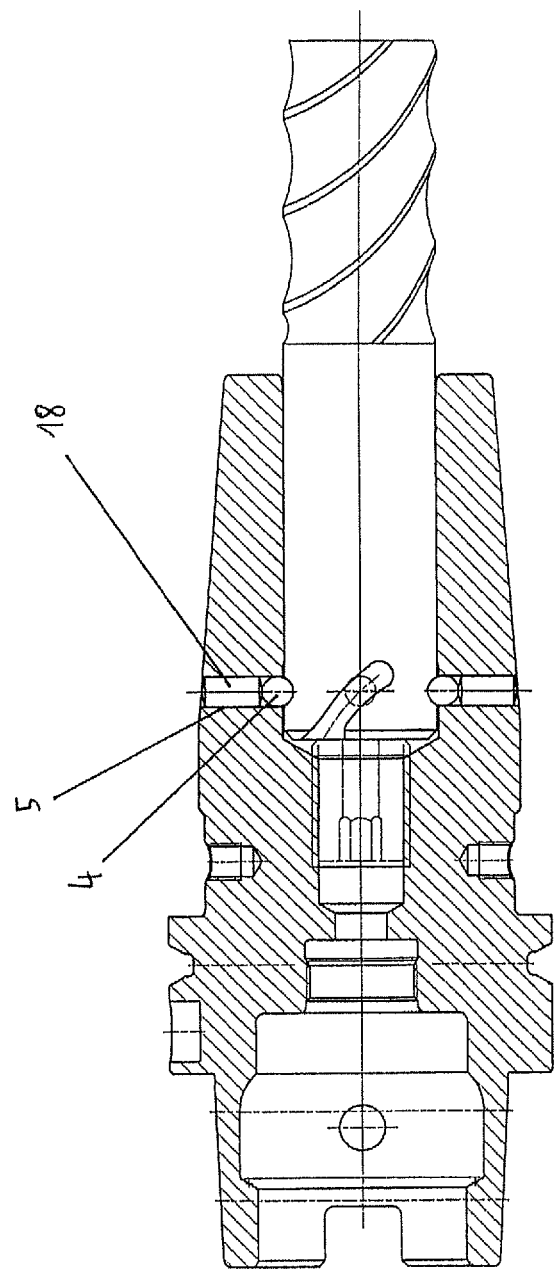
FIG. 9 shows a sectional view of the tool holder according to the invention, comprising balls as locking elements which are secured by cylindrical pins in the press fit.

FIG. 9 shows a shrink fit chuck with locking elements provided as balls 4 in a purely schematic sectional view, where the balls are held in the support bore holes 5 by alignment pins 18. Due to the press fit between the alignment pin 18 and the support bore hole 5, the locking elements provided as balls 4 are fixated in their position.

Figure 10:
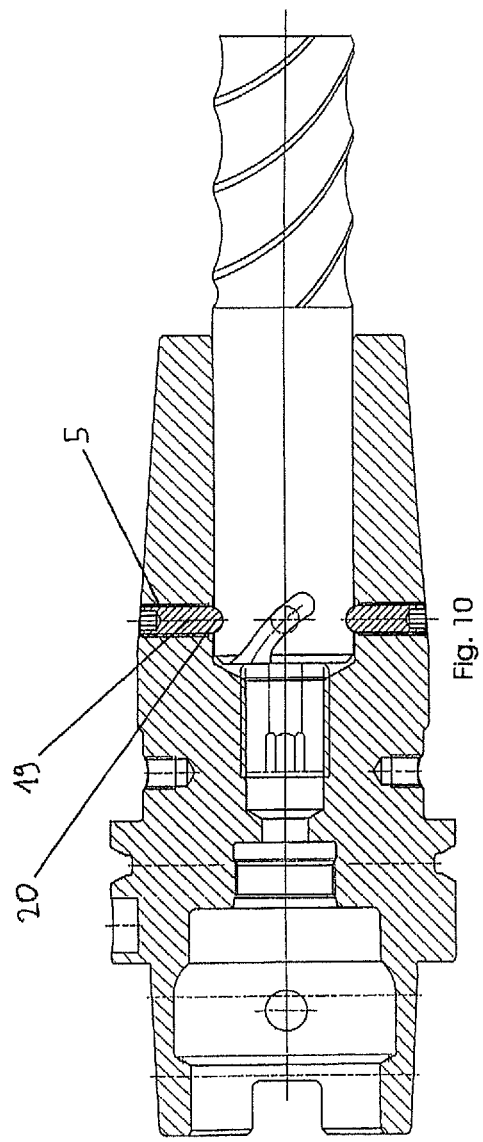
FIG. 10 shows a sectional view of the tool holder according to the invention, comprising a one-piece locking element, which is a threaded pin with a ball shaped embossing at one of its faces.

FIG. 10 shows a shrink fit chuck with one-piece locking elements 19 in a purely schematic sectional view. The locking element 19 is a threaded pin, which comprises a semi-spherical head 20 at one of its faces.

Figure 11:
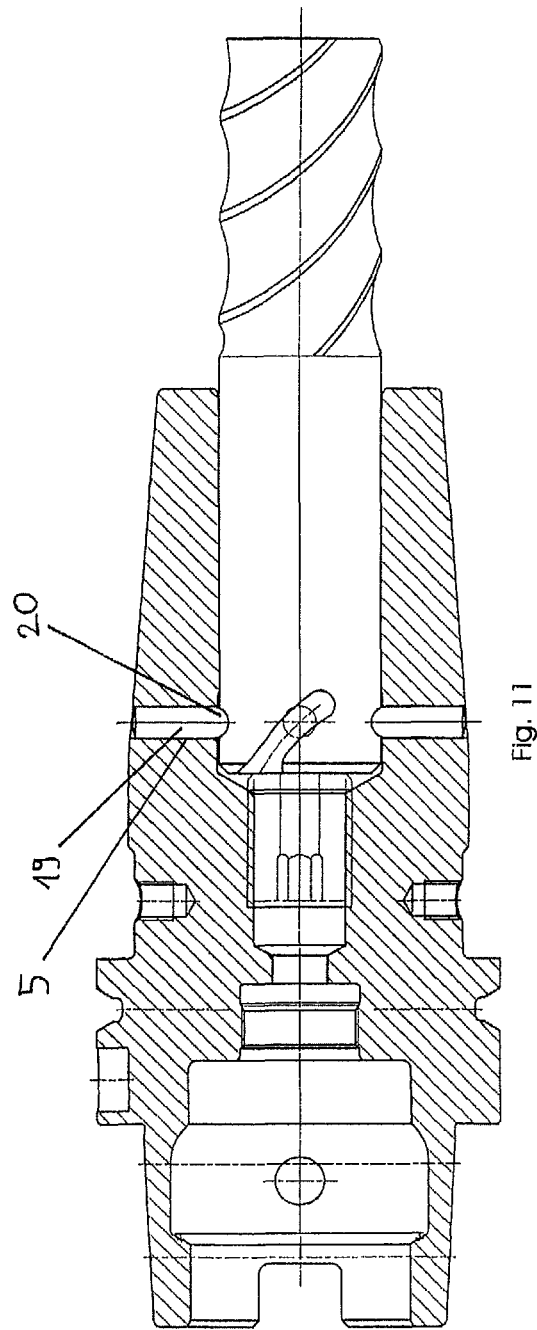
FIG. 11 shows a sectional view of the tool holder according to the invention, comprising one-piece locking elements, which are cylindrical pins with a ball shaped embossing at one of the faces in a press fit.

FIG. 11 shows a shrink fit chuck with a one-piece locking element 19 in the support bore holes 5 in a purely schematic view. The one-piece locking elements 19 are alignment pins, which are connected to the shrink fit chuck through a press fit. The one-piece locking elements 19 comprise a semi-spherical head 20 on one of their faces.

Figure 12:
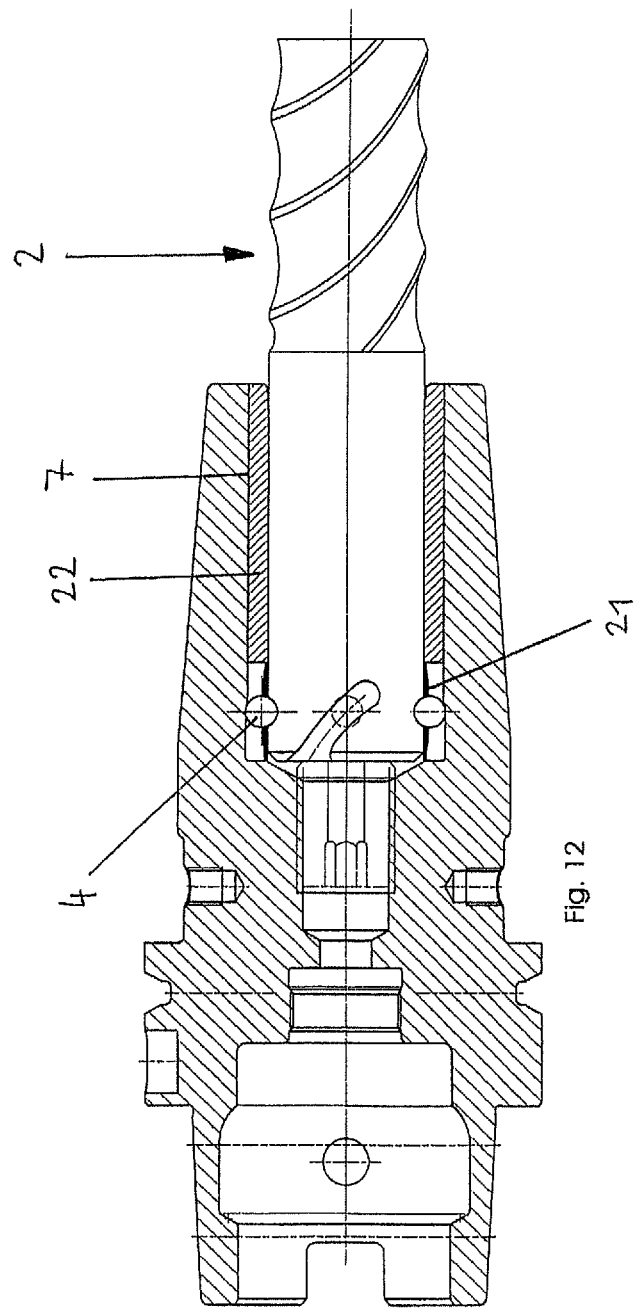
FIG. 12 shows a sectional view of the tool holder according to the invention with balls in a separate ball retainer and a sleeve adjacent thereto.

FIG. 12 shows a shrink fit chuck with locking elements in the form of balls 4 in a purely schematic sectional view. The balls 4 are supported in a ball retainer 21. Thus, the ball retainer 21 is disposed at the bottom of the receiver opening 7. Adjacent thereto, there is a sleeve 22. In the retainer 21, the balls 4 are recessed, which are pressed by the retainer to the radial outside. Thus the balls 4 are thus pressed against a shoulder, which is disposed between the receiver opening 7 and a rotation relief at the end of the receiver opening 7. The balls 4 can be radially supported at said shoulder. When the tool is shrunk in, the balls 4 are supported towards the inside and can secure the end mill cutter 2 as well as the sleeve 22 against an axial pullout.

Figure 13:
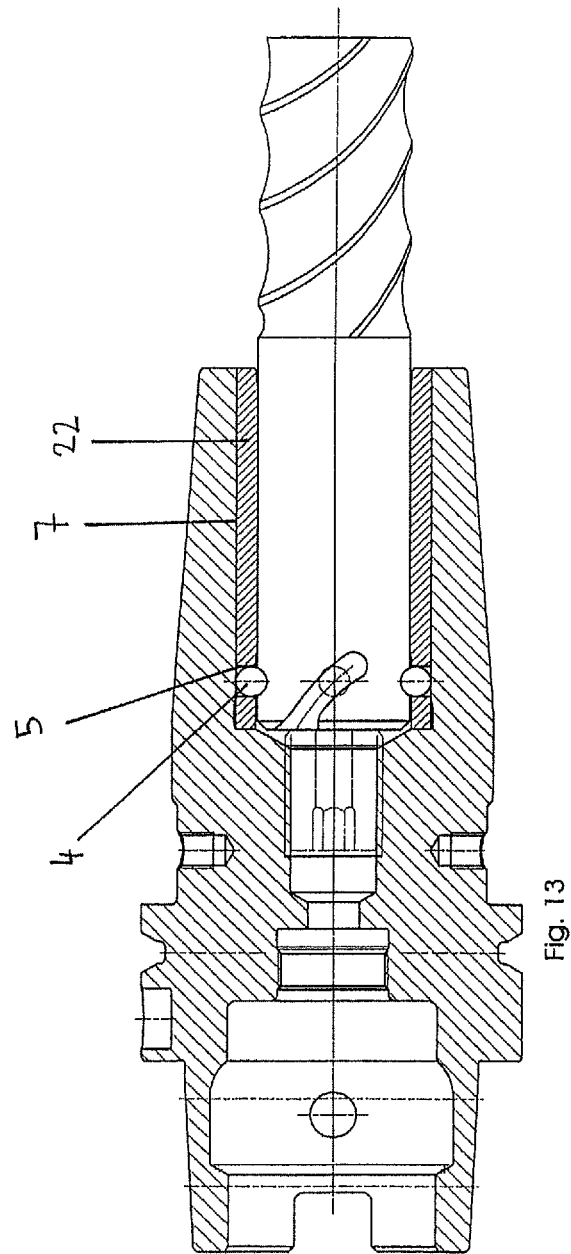

FIG. 13 shows a shrink fit chuck with balls 4 in a purely schematic sectional view, where the balls are disposed in a sleeve 22 in the left section of the sleeve and in the receiver opening 7. The left section of the sleeve 22 thus functions as a ball retainer for the balls 4. The support bore holes 5 for the balls 4 in the sleeve 22 comprise a smaller diameter with reference to the inner cylindrical circumferential surface of the sleeve 22, than the diameter of the balls or the diameter of the support bore hole. Thus, the balls 4 can protrude into the inner cavity but they cannot fall in. The sleeve 22 is either shrunk or pressed into the chuck.

Figure 14:
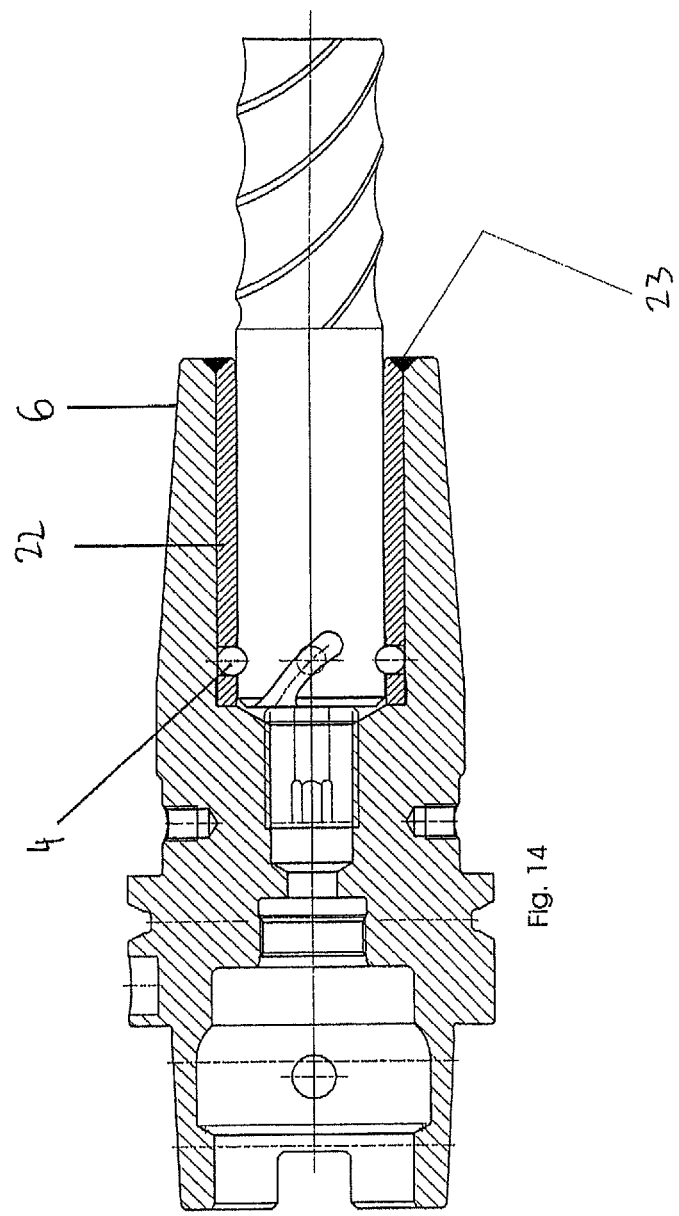
FIG. 14 shows a sectional view of the tool holder according to the invention from FIG. 13, wherein the sleeve is welded to the tool holder.

FIG. 14 shows a shrink fit chuck with balls 4 in a sleeve 22 in a purely schematic sectional view. The sleeve 22 is connected to the sleeve section 6 by a weld 23. The weld of the sleeve 22 with the shrink fit chuck can thus be performed in spots in sections or annular as a closed- or Y-weld.

Figure 15:
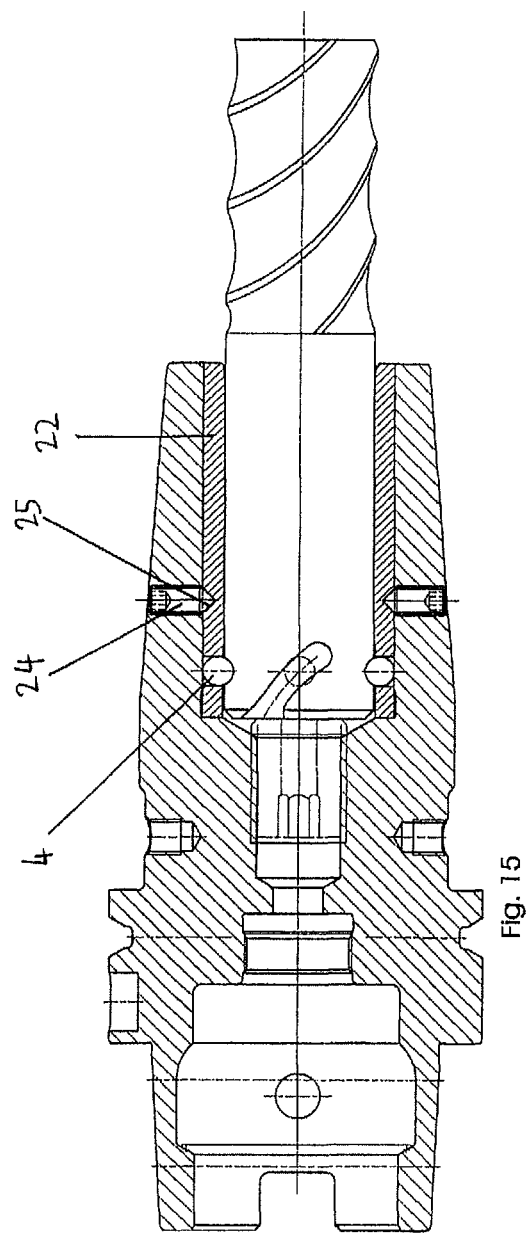
FIG. 15 shows a sectional view of the tool holder according to FIG. 13, where the sleeve is mechanically fixated by threaded pins with a conical dome.

FIG. 15 shows a shrink fit chuck with balls 4 in a sleeve 22 in a purely schematic sectional view. In this embodiment, the sleeve 22 is fixated to the tool holder by threaded pins 24. Thus, the threaded pins 24 e.g. comprise a conical cap. Certainly also other embodiments, like e.g. a ball head, are possible. The sleeve 22 comprises indentations 25 corresponding to the face configuration of the threaded bolts 24, where said indentations are configured corresponding to the face cap configuration of the threaded pins 24. In the present embodiment, said indentations 25 are configured conical. In order to fixate the sleeve 22 at the tool holder, at least one threaded pin 24 with a conical face configuration or with an overall conical configuration is necessary. Preferably, three, in particular four threaded bolts for fixating the sleeve 22 are disposed at the tool holder.

Figure 16:
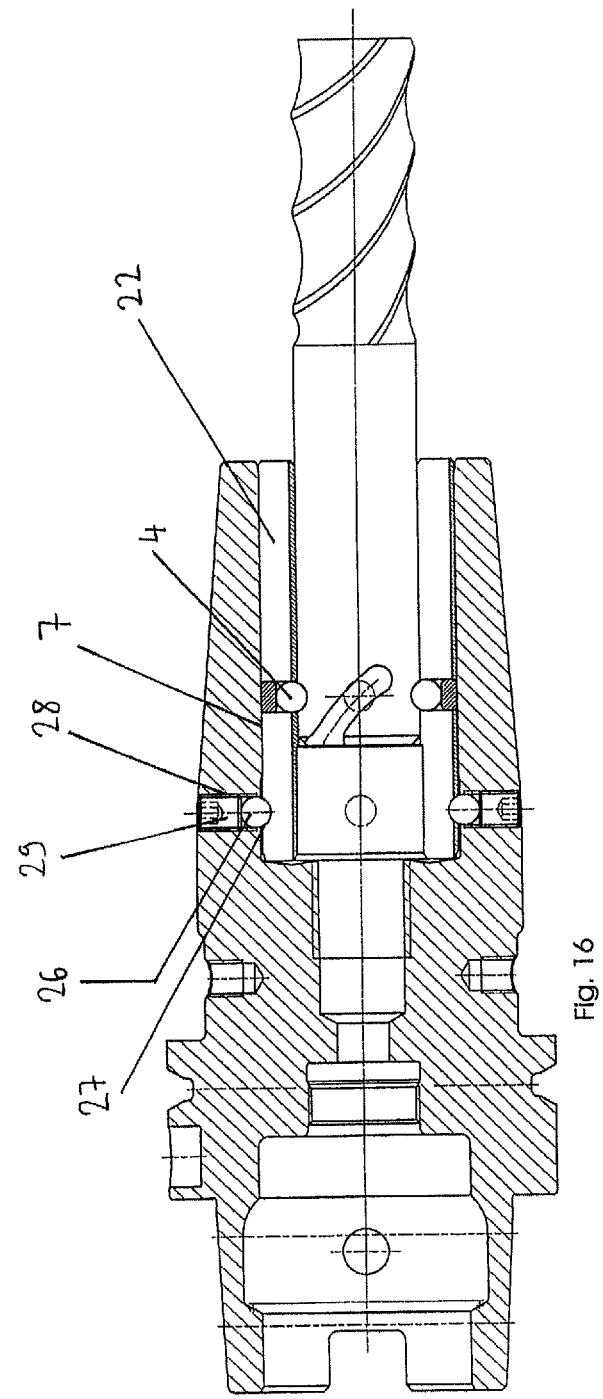
FIG. 16 shows a sectional view of the tool holder according to the invention, comprising a slotted sleeve, which receives the balls, and where the sleeve is provided with locking grooves and held at the tool holder by additional balls and threaded pins.

FIG. 16 shows a shrink fit chuck with the locking elements provided as balls 4, disposed in the sleeve 22, in a purely schematic sectional view. The sleeve 22 is thus configured thicker than in the preceding figures. Therefore, the sleeve 22 is slotted (not shown in the drawing). In this embodiment, the sleeve 22 is also connected to the tool holder by balls. Thus, locking grooves 27 corresponding to the balls are disposed in the left portion of the sleeve 22, where said grooves have a profile corresponding to the balls. The same way as the tool is axially fixated in the shrink fit chuck through the interaction of locking elements and locking grooves, the sleeve 22 is axially fixated through balls 26 as locking elements with locking grooves 27 in the outer circumferential surface of the sleeve 22. The balls 26 are thus disposed in support bore holes 28, which in turn connect threaded pins 29 amongst one another by a thread. Also in this case, the support bore hole 28 comprises a smaller diameter in the inner portion in the direction towards the receiver opening 7, than the diameter of the support, which corresponds to the ball diameter of the ball 26. Thus, the balls 26 cannot fall into the interior cavity, but they protrude into it.

Figure 17:
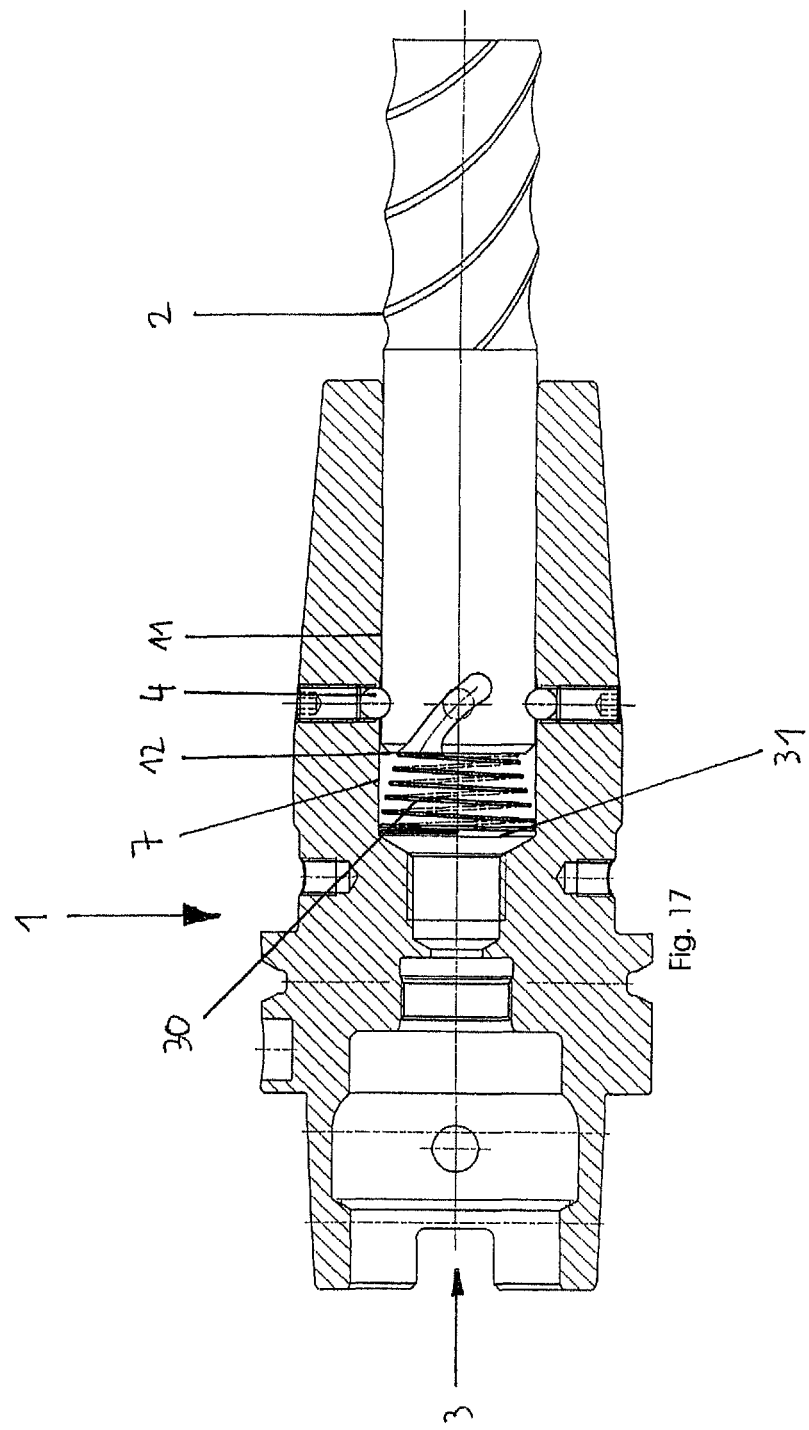
FIG. 17 shows a sectional view of the tool holder according to the invention, comprising a conical spring for a pullout preventer without clearance.

FIG. 17 shows a shrink fit chuck with an axial pullout preventer according to FIG. 2 in a purely schematic sectional view. Additionally, the tool holder comprises a conical spring 30, which is disposed between the face side 12 of the cylinder shaft 11 of the end mill cutter 2 and the bottom 31 of the receiver opening 7. The compression spring provided as a conical spring 30 thus presses onto the face 12 of the end mill 2 cutter in the direction of the rotation axis 3 out of the tool holder 1. Thus, a possible clearance or manufacturing tolerances of the locking grooves in the circumferential surface of the cylinder shaft 11 and the respective position of the balls 4 in the tool holder 1 are eliminated, in as far as the end mill cutter 2 is additionally locked in axial direction by the force of the conical spring 3. Thus, also a small clearance between the axial pullout preventer and the tool can be eliminated. Thus, there is no risk to additionally damage the cutting edges of the tool during operation, due to small manufacturing tolerances.

Figure 18:
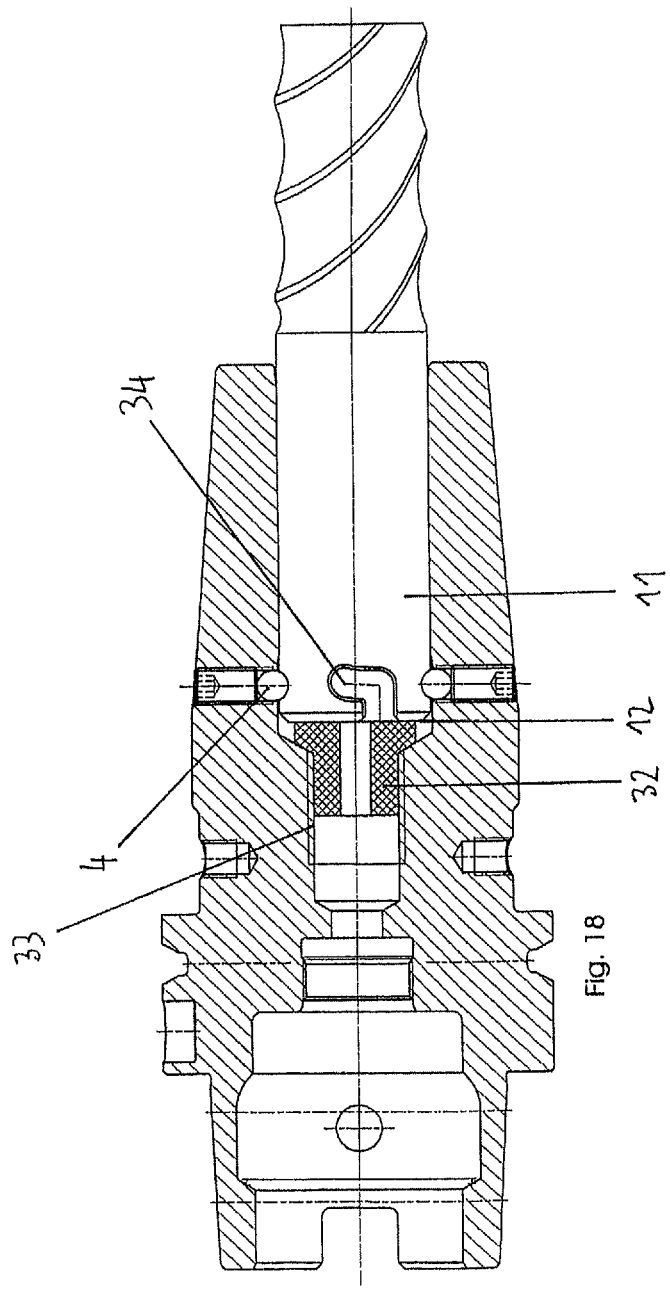
FIG. 18 shows a sectional view of the tool holder according to the invention, comprising a length adjustment screw, which is formed from rubber elastic material.

FIG. 18 shows a shrink fit chuck with the locking elements in the form of balls 4 in a purely schematic sectional view. Herein, a pullout prevention of the tool without clearance is performed after shrinking in through the use of a length adjustment screw 32, which is preferably made of a rubber elastic material. Corresponding to the length adjustment screw 32, a corresponding inner thread 33 is formed in the tool holder. In FIG. 18, another embodiment for the path of the locking groove is shown. In this embodiment, the locking groove 34 is provided in the shape of an "L", but starting at the face 12 of the cylinder shaft 11. Thus, a quasi bayonet lock for an axial safety is provided as a pullout safety for the tool from the tool holder.

Figure 19:
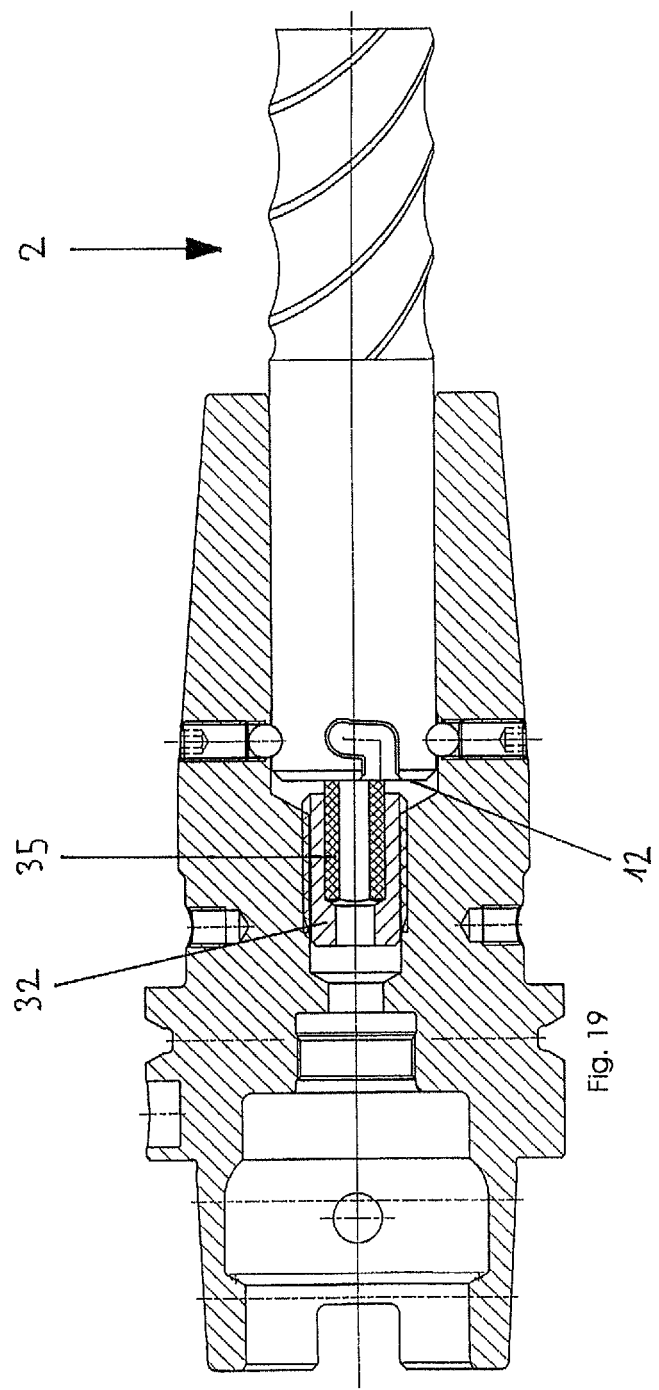
FIG. 19 shows a sectional view of the tool holder according to the invention, comprising a length adjustment screw, which comprises an element made of rubber elastic material.

FIG. 19 shows a shrink fit chuck from FIG. 18 in a purely schematic sectional view, wherein an elastic element 35 is integrated therein, concentric to the length adjustment screw 32. In this case, the elastic element 35 is preferably made of a rubber elastic material. The pullout prevention without clearance is performed through the compression force, which is imparted through the length adjustment screw 32 to the elastic element 35 through the face 12 to the end mill cutter 2.

FIG. 20 shows a shrink fit chuck with a minimum volume lubrication (MMS) in a purely schematic sectional view. The axial pullout prevention is performed by locking elements 36, which are in turn provided as balls. Concentric to the rotation axis in the interior of the shrink fit chuck, there is a movable tube 37, which is the transfer piece for the minimum volume lubrication. The tube 37 is pressed against the tool shaft (not shown in the drawing) due to the spring force of a coil spring 38. In FIG. 20, two possible end positions of the tube 37 are shown. The contact surface of the tube disposed on the right with the tool shaft is provided conical in the shape of a radial tubular flange 39. The coil spring 38 is thus concentrically permeated by the tube 37. The coil spring 38 is disposed between the bottom 31 and the cone section shaped circumferential surface of the tube 37 at the radial neck flange. FIG. 21 illustrates the tangential disposition of the locking elements 36 in the tool holder along the section line A-A of FIG. 20 in a purely schematic sectional view. FIG. 22 shows an enlarged detail of FIG. 20, which is marked by a dashed line. In a radial neck flange 39 of the tube 37, pass-through bore holes 40 are disposed, which extend from the inner diameter of the tube 37 to the outer circumferential surface 41 of the radial tubular flange 39. Along the cylindrical circumferential surface 41 of the radial tubular flange 39 of the tube 37, a concentric cylinder surface shaped recess 42 is disposed, whose width is preferably smaller than the width of the cylindrical circumferential surface 41 of the tubular flange 39. Corresponding to the recess 42, an annular membrane 43 formed as a section of an enveloping surface of a cylinder is disposed, which is formed flush with the outer cylindrical circumferential surface 41 of the tubular flange 39. The membrane 43 is thus preferably formed from a rubber elastic material. Said membrane 43 along the circumferential surface 41 seals the tube 37 against the wall of the receiver opening 7 of the shrink fit chuck. The bore holes 40, which radially lead to the inside of the membrane 43, pass the air pressure onto the membrane 43, which is thus pressed against the wall 7 of the bore hole. Through the pressure buildup, the membrane cambers in radial direction and thus attaches to the inner circumferential surface of the receiver opening 7 of the tool holder. Thus, the tube 37 is secured as a transfer piece for the minimum volume lubrication against axial displacement. Through the movable tube 37, the lubricant mist can be conducted to the tool without loss.

What is claimed is:

1. A system comprising:
   a tool with a rotational axis about which the tool rotates during operation and a tool shaft with a cylindrical surface;
   a tool holder with a clamping chuck for receiving and clamping the tool shaft, wherein the clamping chuck operates to clamp a tool in a torque proof manner;
   a pullout preventer for locking the tool against an axial migration in the direction of the rotational axis of the tool and out of the tool holder, wherein the pullout preventer comprises:
      at least one locking element with a first form locking surface that has at least a partially circular shape; and
      at least one locking groove which corresponds thereto and receives the at least one locking element, the at least one locking groove has a second form locking surface that has at least a partially circular shape that extends between substantially parallel and separated edges of the at least one locking groove and along a substantial portion of the length of the at least one locking groove;
      wherein the at least one locking element and the at least one locking groove interact in a form locking manner such that there is contact between substantial portions of the first and second form locking surfaces and an axial lock is formed by the interaction between the first form locking surface of the at least one locking element and the second form locking surface of the at least one locking groove when the at least one locking element is located in the at least one locking groove,
   wherein one of the at least one locking element and the at least one locking groove is disposed in the cylindrical surface of the tool shaft and the other one of the at least one locking element and the at least one locking groove is disposed in the tool holder, wherein the at least one locking groove follows a path that has a first terminal end, a second terminal end that is separated from the first terminal end, and a curved portion angularly disposed relative to the rotational axis of the tool and having an acute angle relative to the rotational axis of the tool when the tool is operatively associated with the tool holder, the curved portion further defined by a cylindrical surface and at least two separated points on the curved portion being substantially radially equidistant from two separated points on the rotational axis when the tool is operatively associated with the tool holder, wherein the locking groove does not completely encircle the cylindrical shaft.

2. A system according to claim 1, wherein the pullout preventer comprises one of the following: at least one locking groove in the tool, at least two locking grooves in the tool, and at least four locking grooves in the tool.

3. A system according to claim 1, wherein the pullout preventer comprises a plurality of locking elements in the tool holder and a corresponding plurality of locking grooves in the tool that are disposed at the same angle.

4. A system according to claim 3, wherein the plurality of locking elements in the tool holder are balls, pins, bolts, threaded pins or a combination thereof, which comprise at least one and at least a partially ball head shaped convex face configuration, wherein the plurality of locking elements in the tool holder are made of stainless steel alloy, where at least the balls or the partially ball head shaped portions of the locking elements are hardened.

5. A system according to claim 3, wherein the plurality of locking elements are supported in a corresponding plurality of support bore holes in the tool holder, where each of the plurality of support bore holes extend continuously from an outer surface into an inner cavity of the tool holder that receives the tool, and where the plurality of support bore holes are either configured perpendicular to the rotational axis, tangentially adjacent to an inner circumferential surface of the inner cavity that receives the tool, or a combination thereof, where each of the plurality of locking elements is held in one of the plurality of support bore holes by one of the following: a threaded pin, a press fit, and a threaded engagement between the locking element with an exterior thread and an inner thread configured in the support bore hole.

6. A system according to claim 5, wherein each of the plurality of locking elements, when in a supported position in one of the plurality of support bore holes, reach with an at least partially configured ball head shape at least partially into the inner cavity of the tool holder that receives the tool.

7. A system according to claim 3, wherein the plurality of locking elements are balls, and the tool holder comprises at least one ball retainer that defines support bore holes that extend from an outer surface to an inner surface, each of the support bore holes for holding one of the balls and having a smaller diameter with reference to the inner surface, where the at least one ball retainer is a separate component, is machined into a sleeve, or is a sleeve comprising the at least one ball retainer, where the at least one ball retainer is associated with a sleeve, the sleeve is one of: pressed in, shrunk in, welded to the tool holder, held by threaded pins in an interlocking manner, or fixated at the sleeve by locking elements and locking grooves.

8. A system according to claim 1, wherein the pullout preventer further comprising a force imparting element for producing a force in the direction of the rotational axis of the tool when the tool is operatively associated with the tool holder, the force imparting element comprising at least one of the following: a compression spring, a conical spring, a coil spring, a disk spring, spring packets, and rubber elastic elements.

9. A system according to claim 8, wherein the tool holder further comprises a transfer piece for minimum volume lubrication, the transfer piece comprises a tube that defines an inner cavity, a conical radial flange operatively connected to the tube and having a cylindrical enveloping surface, the conical radial flange defining at least one pass-through bore hole that passes through the conical radial flange portion, the conical radial flange of the transfer piece defines a radial recess along the cylindrical enveloping surface, the transfer piece further comprising an annular membrane that is embedded in the radial recess in a form locking and flush manner, the annular member configured from rubber elastic material, where the at least one pass-through bore hole extends radially from the inner cavity of the transfer piece to the membrane.

10. A system according to claim 1, wherein the at least one locking groove begins at a face of the tool and extends over at least a partial section of the cylindrical surface of the tool shaft.

11. A system according to claim 1, wherein the at least one locking groove follows a path with a left pitch direction for a tool with a left groove.

12. A system according to claim 1, wherein the at least one locking element comprises an outer thread associated with the cylindrical surface of the tool shaft, wherein the outer thread has a left pitch direction for a tool with a left groove, wherein the tool holder comprises an inner thread corresponding thereto.

13. A system according to claim 1, wherein at least a portion of the curved portion of the path is helical.

14. A system according to claim 3, wherein the plurality of locking elements are disposed in the tool holder in a plane perpendicular to the rotational axis of the tool when the tool is operatively associated with the tool holder.

15. A system according to claim 1, wherein the at least one locking groove follows a path with a right pitch direction for a tool with a right groove.

16. A system according to claim 1, wherein the at least one locking element comprises an outer thread associated with the cylindrical surface of the tool shaft, wherein the outer thread has a right pitch direction for a tool with a right groove, wherein the tool holder comprises an inner thread corresponding thereto.

* * * * *